Patented Aug. 22, 1933

1,923,491

UNITED STATES PATENT OFFICE 1,923,491

PROCESS FOR THE PREPARATION OF NEW CRYSTALLIZED GLUCOSIDES FROM DIGITALIS

Walter Kreis, Basel, Switzerland, assignor to firm: Chemical Works formerly Sandoz, Basel, Switzerland No Drawing. Application August 22, 1931, Serial No. 558,834, and in Germany April 13, 1931

4 Claims. (Cl. 87—28)

This invention relates to the preparation of new crystallized glucosides from digitalis.

In the specification of applicant's U. S. patent application Ser. 517,125, filed February 19, 1931, a process is described for the isolation of a cardioactive uniformly crystallized glucoside preparation from digitalis lanata, which is not altered in its properties by repeated re-crystallization and precipitation from various solvents and which has therefore been considered to be a homogene body.

The exhaustive researches made with this preparation have unexpectedly conducted to the result that this product is a mixture of three new different cardioactive isomorph crystallized glucosides, which may be separated by using a special fractionating process.

In order to clearly describe the present invention, the new glucosides will be called in the description as glucoside A, glucoside B and glucoside C and the starting material will be designated as mixture of crystallized glucosides.

The process for the preparation of the new crystallized glucosides A, B and C consists in that the mixture of the crystallized glucosides from digitalis lanata is dissolved in a suitable organic solvent, non-miscible with water, such as chloroform or ethylacetate, to which in order to obtain a sufficiently concentrated solution is added a certain amount of an organic solvent miscible with water like methanol, ethylalcohol or acetone. The solution of the glucosides thus obtained is shaken with water, left to stand and the different layers containing the fractions of glucosides are separated from one another. The obtained fractions of glucosides are then under suitable conditions repeatedly shaken in the manner described above and this process of fractionation is so long repeated until the properties of the glucoside fractions obtained do no more change on further fractionation.

The present process is therefore based on the different distribution of the three glucosides A, B and C between two solvents which are not miscible together and one of which is an organic solvent nonmiscible with water and the other one is almost an aqueous medium.

I am aware that it is not new to separate a mixture of digitalis glucosides by means of their different solubility in two solvents not miscible together. In accordance with the example of the German Patent No. 514.096 an alcoholic-aqueous solution of a mixture of the natural digitalis gulcosides is shaken with chloroform whereby different fractions are obtained. In this case the object of the manipulations is to fractionate a raw not crystallizable extract from digitalis until a crystallizable fraction is obtained, which is then further purified by recrystallization. But the present process is in so far different from the above cited as the fractionation is carried out with an already crystallized product which seems to be completely homogene, until the properties of the fractions of glucosides obtained in this way do no more change at all. It has for the first time been found, that it exists between certain digitalis glucosides crystallo-isomorphismus which prevent their separation by way of fractionated crystallization. Furthermore it has up to now never been described to separate such a mixture by using their different solubilization in two different solvents.

By means of Keller's color reaction, which is carried out by underlying with concentrated sulphuric acid a solution of the glucoside in glacial acetic acid containing ferric chloride, whereby different colorations specific to each glucoside are obtained, it becomes possible to detect the new glucosides in their solutions.

For carrying out the present invention, e. g. a solution of the mixture of crystallized glucosides in chloroform containing methanol in definite proportions, like those given in Example 1, is shaken with water and left to stand for a certain time. Three layers are formed, on the bottom a chloroform solution (Chl), on the upper part an aqueous solution of methanol (W) and a middle layer (Z) which is constituted by an undissolved, deliquescent substance. In the lower layer (Chl) the glucoside A is concentrated which is recognized by the fact that by carrying out Keller's reaction with this fraction the colored zone in the lower part of the contact surface of the liquids is colored less red as it is the case with the starting material. By repeatedly shaking the fraction obtained from the chloroform solution in the same manner as said above and by separating always the chloroform layer, a new compound is isolated that gives by Keller's reaction in the lower part of the contact surface of the liquids a pure brown zone, free from any red coloration. The properties of this compound do then no more change on further fractionation.

In the undissolved middle layer (Z) is concentrated the glucoside B, which is characterized by the strong red coloration in the lower part of the contact surface of the liquids given by Keller's reaction. If the shaking operation repeated 3–4 times with this fraction in the same manner as disclosed above, and the undissolved layer worked up as described, a new body is obtained which does no more change in its properties on further fractionations. It gives by Keller's reaction a brilliant red ring in the lower part of the contact surface of the liquids.

The upper methanol containing aqueous layer (W) contains the major part of the glucoside C, besides a small quantity of glucoside A and a bit larger quantity of glucoside B. Both glucosides A and B can be separated by repeated shaking with chloroform, whereby the glucoside A is better soluble therein as the glucoside B. The shaking is therefore repeated until the red zone given on Keller's reaction by the glucoside B has completely disappeared. The glucoside C isolated in this manner does no more change in its properties on further fractionation and is very difficult to distinguish from the glucoside A. It gives by Keller's reaction a brown zone without any red shade.

The process can also be carried in the way that first a solution of the mixture of crystallized glucosides in ethylacetate is shaken with water in presence of methanol, until the ethylacetate solution contains only the glucoside A, which is recognized by the lack of the red zone on Keller's reaction. The aqueous-methanol fractions containing the glucosides B and C besides a small quantity of the glucoside A, are then extracted with chloroform until they are free from the glucosides A and B, which term is recognized by the lack of a red ring on Keller's reaction. The mixture of the glucosides A and B contained in chloroform can then be separated into the components by using ethylacetate and controlling the layers with Keller's reaction.

In the same manner other combinations of solvents may be used for carrying out the present process. It is also clear that this process can be used for the separation of mixtures of glucosides obtained from digitalis lanata by any process, provided that the mixtures contain the different glucosides. It can also be applied to a crystallized material that contains some impurities and is not restricted to the highly purified mixture obtained by the process described in the specification of applicant's U. S. patent application Ser. 517,125, filed February 19, 1931.

*Description of the three new glucosides A, B and C*

The glucoside A crystallizes from methanol and alcohol in uniform, colorless, sometimes to 10 mm. length, thin narrow plates, which are degradated on drying in vacuo or in the air. One part of it is soluble at ordinary temperature in about 20 parts of methanol, 40 parts of absolute ethylalcohol, 200 parts of ethylacetate, 225 parts of chloroform and 16000 parts of water. Its specific optical behaviour calculated on substance dried at 100° C. in a high vacuo is in dioxane solution of $$\left[\alpha\right]_D^{20°C.} = +24.5° (C=4)$$

and in ethyl alcohol of 95% of $$\left[\alpha\right]_D^{20°C.} = +38.7° (C=1.88).$$

By Keller's reaction the glucoside A gives in the lower part of the contact surface of the liquids a brown zone, without any red shade, and in glacial acetic acid a blue to a blue-green coloration. The hydrolysis with diluted mineral acids in aqueous-alcoholic solution gives as aglucone only digitoxigenin.

Until now only one crystallized digitalis glucoside yielding as aglucone only digitoxigenin was known and this was the digitoxin. The glucoside A is completely different from that as shown by the following table.

|  | Digitoxin | Glucoside A |
|---|---|---|
| Solubility in chloroform | In less than 20 parts. | In about 225 parts. |
| Solubility in water | In about 100,000 parts. | In about 16,000 parts. |
| Spec. opt. behaviour in dioxane solution (C=4) | $\left[\alpha\right]_D^{20°C.}=+8°$ (Digitoxin cryst. Merk.) | $\left[\alpha\right]_D^{20°C.}=+24.5°$ |
| Aglucone content | 47,9% (Cloetta) (theor. content 49%). | 37–38%. |
| Digitoxose content | 58,2%. | 29% (±2%). |

The glucoside A obtained according to the present process was therefore unknown; its frogs toxicity determinated by the Houghton-Straub method with rana temporaria was found to be about 550,000 F. D. per 1 gr. substance.

The glucoside B crystallizes from methanol and ethylalcohol in uniform colorless, to 10 mm. length, thin narrow plates which are degradated on drying in vacuo or in the air. One part of it is dissolved at ordinary temperature by about 15 parts of methanol, 40 parts of absolute ethylalcohol, 3500 parts of ethylacetate, 550 parts of chloroform and 700 parts of water. Its specific optical behaviour is in ethylalcohol of 95% of $$\left[\alpha\right]_D^{20°C.} = +34,8° (C=1.91)$$

calculated on a substanced dried in high vacuo at 100° C.

By Keller's reaction the glucoside B gives in the lower part of the contact surface of the liquids a brilliant-red ring and in glacial acetic acid a blue to a blue-green coloration. The hydrolysis with diluted mineral acids in an aqueous-alcoholic solution gives as aglucone only the gitoxigenin.

Until now only one crystallized digitalis glucoside yielding as aglucone only the gitoxigenin was known and it was the gitoxin (=bigitalinum). From this substance the new glucoside B is completely different as shown by the following table.

|  | Gitoxin (bigitalinum) | Glucoside B |
|---|---|---|
| Solubility in methanol | In about 4,500 parts. | In about 15 parts. |
| Spec. opt. behaviour | Inactive | $\left[\alpha\right]_D^{20°C.}=+34.8°$ |
| Aglucone content | 46,8% (theor. content 50%) | 37–38%. |
| Digitoxose content | 57% | 29%(±2%). |

The glucoside B prepared according to the present process represents therefore an absolutely new digitalis glucoside. Its frogs toxicity determinated by the Houghton-Straub method with rana temporaria was found to be about 20% smaller as that of the glucoside A and of digitoxin and is about 450,000 F. D. per 1 gr. substance.

The glucoside C crystallizes from methanol and ethylalcohol in uniform, colorless, to 10 mm. length, narrow thin plates, which are degradated on drying in vacuo or in the air. One part of it is soluble at ordinary temperature in about 20 parts of methanol, 45 parts of absolute ethylalcohol, 3300 parts of ethylacetate, 1500 parts of chloroform and 17,000 parts of water. Its specific optical behaviour calculated on the substance dried in high vacuo at 100° C. is in ethylalcohol of 95% of $$\left[\alpha\right]_D^{20°\,C.} = +33,4° \ (C=1,93).$$

By Keller's reaction the glucoside C gives in the lower part of the contact surface of the liquids a brown zone, without any red shade and in glacial acetic acid a blue to a blue-green coloration. The hydrolysis with diluted mineral acids in an aqueous-alcoholic solution yields as aglucone only the lanadigigenin (digoxigenin).

Until now only two crystallized digitalis glucosides yielding as aglucone only the lanadigigenin where known and which are the lanadigin (see C. Mannich (Archiv der Pharmazie und Ber. d. deutschen pharmazeutischen Gesellschaft 268, 453) and the Digoxin (see Smith, Journal of the Chem. Soc., March 1930, page 508). The new glucoside C as shown by the following table is completely different from the above cited substances.

|  | Lanadigin | Digoxin | Glucoside C |
|---|---|---|---|
| Sol. in chloroform. | In 300 parts | Nearly insoluble. | In 1500 parts |
| Sol. in water. | In 600 parts | | In 17,000 parts. |
| Aglucone content. | About 45% (theor. content 47%). | 49,2% (theor. content 50%). | 37–38%. |
| Digitoxose content. | 17,8% | 57% | 29% (±2%). |

The glucoside C obtained by the present process represents therefore a quite new digitalis glucoside. Its frogs toxicity determinated by the Houghton-Straub method with rana temporaria is similar to that of the glucoside B and is about 450,000 F. D. per 1 gr. substance.

By careful hydrolysis of the glucosides A, B and C there will be obtained besides the aglucone 29% (±2%) of crystallized digitoxose and 31% (±2%) of a crystallized biose $C_{12}H_{22}O_9$, which by energic hydrolysis can further be split into digitoxose and glucose according to the equation:

$$C_{12}H_{22}O_9 + H_2O = C_6H_{12}O_4 + C_6H_{12}O_6.$$

The digitoxose content given in the above tables does not show the total content, but only the quantity of digitoxose obtained on careful hydrolysis of the glucosides A, B and C, and not that of the biose.

The following examples which are not limitative illustrate the present process.

Example 1

A solution of 16 parts of a mixture of crystallized glucosides prepared as described in the specification of said U. S. patent application Ser. No. 517,125, in a mixture composed of 800 parts of methanol and 4000 parts of chloroform is vigorously shaken with 4000 parts of water and left to stand for a certain time. On standing three layers are formed, on the bottom a chloroform solution ($Chl_1$), a middle layer composed of an undissolved deliquescent substance ($Z_1$) and an upper methanol-acqueous layer ($W_1$). The under layer ($Chl_1$) is separated from the others, concentrated in vacuo to the half of its volume, mixed with 400 parts of methanol and shaken with 2000 parts of water. On standing three layers are again formed, the under layer ($Chl_2$) is then separated, concentrated to its half volume, mixed with 200 parts of methanol and shaken with 1000 parts of water. After standing the lower chloroform layer is again separated and treated twice with methanol and water in the manner above described. The chloroform solution ($Chl_5$) finally obtained is concentrated in vacuo, whereby the glucoside A possessing the above given properties and free from the glucosides B and C, is obtained.

The aqueous-methanol layers obtained during the shaking operations are then mixed with the first upper layer ($W_1$) and shaken 5 to 6 times with the same volume of chloroform, whereby a separation of the glucosides A and B is obtained. By concentrating the aqueous solution in vacuo, the new glucoside C possessing the properties given above is obtained.

The chloroform solutions obtained during the manipulations are evaporated to dryness in vacuo and mixed with the undissolved middle layer ($Z_1$). The product obtained in this way is then treated with chloroform-methanol and water in the same manner as it has been described in the beginning of this example, whereby the obtained undissolved middle layer ($Z_2$) is treated 3–4 times in this way, until the fraction $Z_5$ or $Z_6$ is obtained. The last fraction $Z_6$ contains then only the glucoside B, free from the glucosides A and C.

The remaining fractions containing the mixture of the glucosides are then evaporated to dryness in vacuo and worked up again as described in this example.

Example 2

A solution of 10 parts of the mixture of crystallized glucosides in a mixture composed of 250 parts of methanol and 5000 parts of ethylacetate is shaken with 5000 parts of water. After separation of the layers, the ethylacetate solution ($E_1$) is concentrated in vacuo to about 3000 parts, mixed with 150 parts of methanol and shaken with 3000 parts of water. After separation of the layers, the ethylacetate solution obtained is again concentrated to about 60% of its primordial volume, mixed with the respective quantity of methanol and shaken with water. The fractionation is carried out in this way until an ethylacetate solution $E_5$ is obtained. By evaporating it in vacuo the pure glucoside A, free from the glucosides B and C is obtained.

The aqueous solutions obtained during the shaking operations are then mixed together, extracted with chloroform in the manner described in Example 1 and evaporated in vacuo, whereby the pure glucoside C is obtained. The remaining chloroform solutions are mixed together, evaporated in vacuo and the residue is fractionated with chloroform-methanol and water in the same manner as described in the Example 1, whereby only the middle layer ($Z_1$ to $Z_4$) composed of the undissolved substance is always subjected to the fractionation. The finally obtained middle layer $Z_5$ is composed of the pure guloside B, free from the gluosides A and C.

The remaining fractions are then dried in vacuo and subjected again to the fractionation operations in the manner described in the Examples 1 and 2.

Elementary analyses of the three glucosides A, B and C are given as follows:—

*Glucoside A.—Formula* $C_{49}H_{76}O_{19}.H_2O$

Elementary analysis:
Found: C=59.4% to 59.8% and H=7.9% to 8.1%

Calculated: C=59.60% and H=7.97%
*Molecular weight.*—Found: M=984, calculated: M=986.6
*Splitting equation.*—(Complete acid hydrolysis)

$$C_{49}H_{76}O_{19}.H_2O + 5H_2O = C_{23}H_{34}O_4 +$$
glucoside A          digitoxigenin
$$3C_6H_{12}O_4 + C_6H_{12}O_6 + C_2H_4O_2 + H_2O$$
digitoxose   glucose            acetic acid

*Glucoside B.*—Formula: $C_{49}H_{76}O_{20}$

*Elementary analysis:*
Found: C=59.5% to 59.9% and H=7.7% to 7.8%
Calculated: C=59.72% and H=7.78%
*Molecular weight.*—Found: M=990, calculated M=984.6
*Splitting equation.*—(Complete acid hydrolysis)

$$C_{49}H_{76}O_{20} + 5H_2O = C_{23}H_{34}O_5 +$$
glucoside B      gitoxigenin
$$3C_6H_{12}O_4 + C_6H_{12}O_6 + C_2H_4O_2$$
digitoxose   glucose   acetic acid

*Glucoside C.*—Formula: $C_{49}H_{76}O_{20}$

*Elementary analysis:*
Found: C=50.6% to 60.0% and H=7.7% to 7.9%
Calculated: C=59.72% and H=7.78%
*Molecular weight.*—Found: M=996, calculated M=984.6
*Splitting equation.*—(Complete acid hydrolysis)

$$C_{49}H_{76}O_{20} + 5H_2O = C_{23}H_{34}O_5 +$$
glucoside C   digoxigenin
              (lanadigigenin)
$$3C_6H_{12}O_4 + C_6H_{12}O_6 + C_2H_4O_2$$
digitoxose  glucose  acetic acid

What I claim is:

1. A process for the preparation of new crystallized cardioactive glucosides from digitalis lanata comprising the steps of dissolving an isomorphic crystallizing mixture of glucosides from digitalis lanata in an organic solvent, nonmiscible with water and containing an organic solvent miscible with water, shaking the solution thus obtained by means of water, separating the layers formed and repeating these operations with each of the layers until the properties of the glucosides contained therein do no more change and give a distinct coloration by Keller's reaction.

2. As a new article of manufacture the cardioactive crystallized digitalis glucoside which is in the dry state a colorless compound crystallizing in narrow thin plates, 1 part of which is soluble at normal temperature in about 20 parts of methanol, 40 parts of absolute ethylalcohol, 200 parts of ethylacetate, 225 parts of chloroform and 16,000 parts of water, its specific optical behaviour being in ethylalcohol of 95% of $$\left[\alpha\right]_D^{20°C.} = +38.7°$$

and which yields on hydrolysis with diluted mineral acids as aglucone only the digitoxigenin and which gives by Keller's reaction in the lower part of the contact surface of the liquids a brown zone and in glacial acetic acid a blue to a blue-green coloration.

3. As a new article of manufacture the cardioactive crystallized digitalis glucoside which is in the dry state a colorless compound, crystallizing in narrow thin plates, 1 part of which is soluble at normal temperature in about 15 parts of methanol, 40 parts of absolute ethylalcohol, 3500 parts of ethylacetate, 550 parts of chloroform and 700 parts of water, its specific optical behaviour being in ethylalcohol of 95% of $$\left[\alpha\right]_D^{20°C.} = +34.8°$$

and which yields on hydrolysis with diluted mineral acids as aglucone only the gitoxigenin and which gives by Keller's reaction in the lower part of the contact surface of the liquids a brilliant red ring and in the glacial acetic acid a blue to a blue-green coloration.

4. As a new article of manufacture the cardioactive crystallized digitalis glucoside which is in the dry state a colorless compound, crystallizing in thin narrow plates, 1 part of which is soluble at ordinary temperature in about 20 parts of methanol, 45 parts of absolute ethylalcohol, 3300 parts of ethylacetate, 1500 parts of chloroform and 17,000 parts of water, its specific optical behaviour being in ethylalcohol of 95% of $$\left[\alpha\right]_D^{20°C.} = +33.4°$$

and which yields on hydrolysis with diluted mineral acids as aglucone only the lanadigigenin and which gives by Keller's reaction in the lower part of the contact surface of the liquids a brown zone and in the glacial acetic acid a blue to a blue-green coloration.

WALTER KREIS.

---

CERTIFICATE OF CORRECTION.

Patent No. 1,923,491.                                    August 15, 1933.

WALTER KREIS

It is hereby certified that error appears in the printed specification of the above numbered patent requiring correction as follows: Page 4, line 25, for "50.6%" read 59.6%; and that the said Letters Patent should be read with this correction therein that the same may conform to the record of the case in the Patent Office.

Signed and sealed this 12th day of December, A. D. 1933.

(Seal)

F. M. Hopkins
Acting Commissioner of Patents.

Calculated: C=59.60% and H=7.97%
*Molecular weight.*—Found: M=984, calculated: M=986.6
*Splitting equation.*—(Complete acid hydrolysis)

$$C_{49}H_{76}O_{19}.H_2O + 5H_2O = C_{23}H_{34}O_4 +$$
glucoside A    digitoxigenin
$$3C_6H_{12}O_4 + C_6H_{12}O_6 + C_2H_4O_2 + H_2O$$
digitoxose    glucose    acetic acid

*Glucoside B.*—Formula: $C_{49}H_{76}O_{20}$

*Elementary analysis:*
Found: C=59.5% to 59.9% and H=7.7% to 7.8%
Calculated: C=59.72% and H=7.78%
*Molecular weight.*—Found: M=990, calculated M=984.6
*Splitting equation.*—(Complete acid hydrolysis)

$$C_{49}H_{76}O_{20} + 5H_2O = C_{23}H_{34}O_5 +$$
glucoside B    gitoxigenin
$$3C_6H_{12}O_4 + C_6H_{12}O_6 + C_2H_4O_2$$
digitoxose    glucose    acetic acid

*Glucoside C.*—Formula: $C_{49}H_{76}O_{20}$

*Elementary analysis:*
Found: C=50.6% to 60.0% and H=7.7% to 7.9%
Calculated: C=59.72% and H=7.78%
*Molecular weight.*—Found: M=996, calculated M=984.6
*Splitting equation.*—(Complete acid hydrolysis)

$$C_{49}H_{76}O_{20} + 5H_2O = C_{23}H_{34}O_5 +$$
glucoside C    digoxigenin (lanadigigenin)
$$3C_6H_{12}O_4 + C_6H_{12}O_6 + C_2H_4O_2$$
digitoxose    glucose    acetic acid

What I claim is:

1. A process for the preparation of new crystallized cardioactive glucosides from digitalis lanata comprising the steps of dissolving an isomorphic crystallizing mixture of glucosides from digitalis lanata in an organic solvent, nonmiscible with water and containing an organic solvent miscible with water, shaking the solution thus obtained by means of water, separating the layers formed and repeating these operations with each of the layers until the properties of the glucosides contained therein do no more change and give a distinct coloration by Keller's reaction.

2. As a new article of manufacture the cardioactive crystallized digitalis glucoside which is in the dry state a colorless compound crystallizing in narrow thin plates, 1 part of which is soluble at normal temperature in about 20 parts of methanol, 40 parts of absolute ethylalcohol, 200 parts of ethylacetate, 225 parts of chloroform and 16,000 parts of water, its specific optical behaviour being in ethylalcohol of 95% of $$\left[\alpha\right]_D^{20°C.} = +38.7°$$

and which yields on hydrolysis with diluted mineral acids as aglucone only the digitoxigenin and which gives by Keller's reaction in the lower part of the contact surface of the liquids a brown zone and in glacial acetic acid a blue to a blue-green coloration.

3. As a new article of manufacture the cardioactive crystallized digitalis glucoside which is in the dry state a colorless compound, crystallizing in narrow thin plates, 1 part of which is soluble at normal temperature in about 15 parts of methanol, 40 parts of absolute ethylalcohol, 3500 parts of ethylacetate, 550 parts of chloroform and 700 parts of water, its specific optical behaviour being in ethylalcohol of 95% of $$\left[\alpha\right]_D^{20°C.} = +34.8°$$

and which yields on hydrolysis with diluted mineral acids as aglucone only the gitoxigenin and which gives by Keller's reaction in the lower part of the contact surface of the liquids a brilliant red ring and in the glacial acetic acid a blue to a blue-green coloration.

4. As a new article of manufacture the cardioactive crystallized digitalis glucoside which is in the dry state a colorless compound, crystallizing in thin narrow plates, 1 part of which is soluble at ordinary temperature in about 20 parts of methanol, 45 parts of absolute ethylalcohol, 3300 parts of ethylacetate, 1500 parts of chloroform and 17,000 parts of water, its specific optical behaviour being in ethylalcohol of 95% of $$\left[\alpha\right]_D^{20°C.} = +33.4°$$

and which yields on hydrolysis with diluted mineral acids as aglucone only the lanadigigenin and which gives by Keller's reaction in the lower part of the contact surface of the liquids a brown zone and in the glacial acetic acid a blue to a blue-green coloration.

WALTER KREIS.

---

CERTIFICATE OF CORRECTION.

Patent No. 1,923,491.    August 15, 1933.

WALTER KREIS

It is hereby certified that error appears in the printed specification of the above numbered patent requiring correction as follows: Page 4, line 25, for "50.6%" read 59.6%; and that the said Letters Patent should be read with this correction therein that the same may conform to the record of the case in the Patent Office.

Signed and sealed this 12th day of December, A. D. 1933.

F. M. Hopkins
Acting Commissioner of Patents.

(Seal)

CERTIFICATE OF CORRECTION.

Patent No. 1,923,491.  August 15, 1933.

WALTER KREIS

It is hereby certified that error appears in the printed specification of the above numbered patent requiring correction as follows: Page 4, line 25, for "50.6%" read 59.6%; and that the said Letters Patent should be read with this correction therein that the same may conform to the record of the case in the Patent Office.

Signed and sealed this 12th day of December, A. D. 1933.

(Seal)

F. M. Hopkins
Acting Commissioner of Patents.